May 16, 1950     H. P. LASSETER     2,508,068

SHIP STABILIZER

Filed Feb. 27, 1946     4 Sheets-Sheet 1

Inventor

HUBERT P. LASSETER

By Kimmel & Crowell

Attorneys

May 16, 1950 H. P. LASSETER 2,508,068
SHIP STABILIZER
Filed Feb. 27, 1946 4 Sheets-Sheet 2
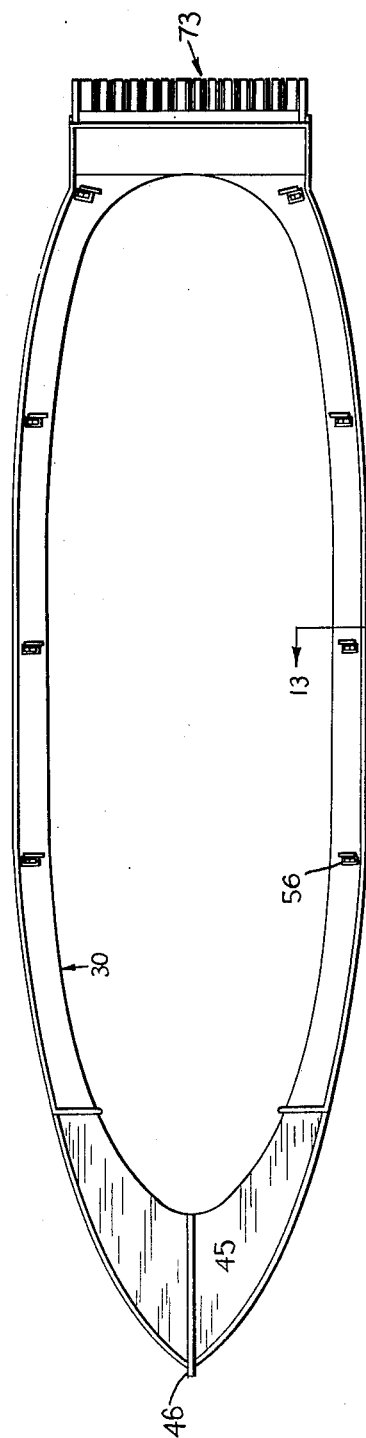
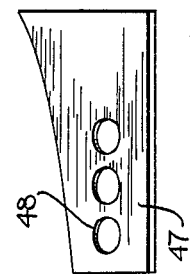
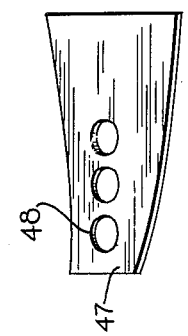
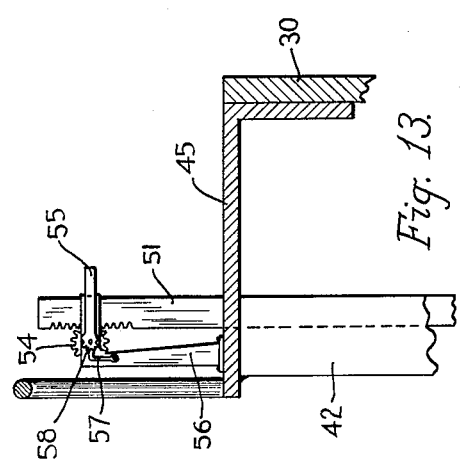
Inventor
HUBERT P. LASSETER
By Kimmel & Crowell
Attorneys May 16, 1950   H. P. LASSETER   2,508,068
SHIP STABILIZER
Filed Feb. 27, 1946   4 Sheets-Sheet 3
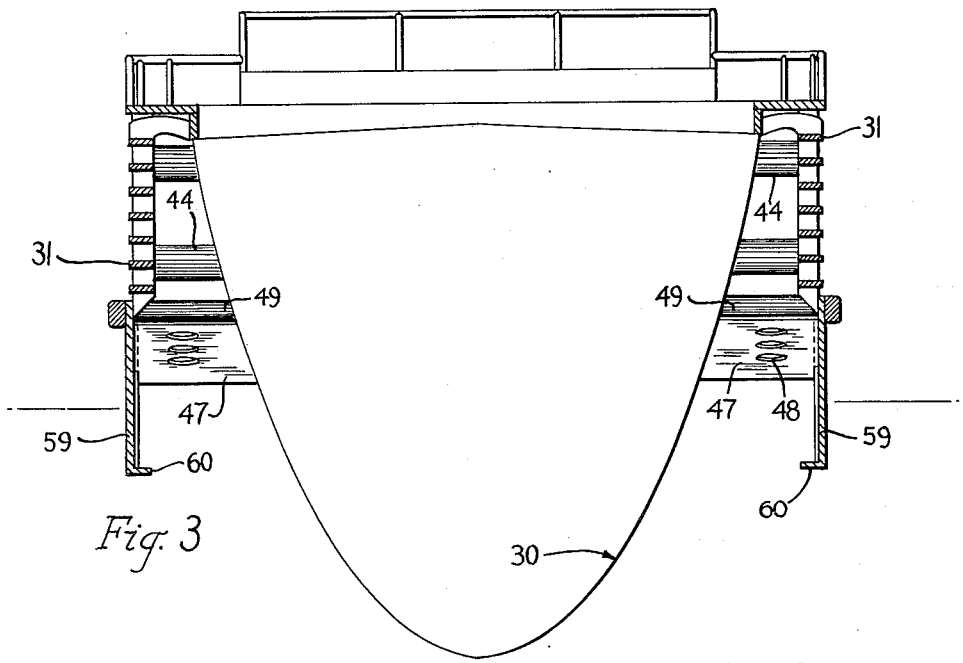
Fig. 3
Fig. 9.
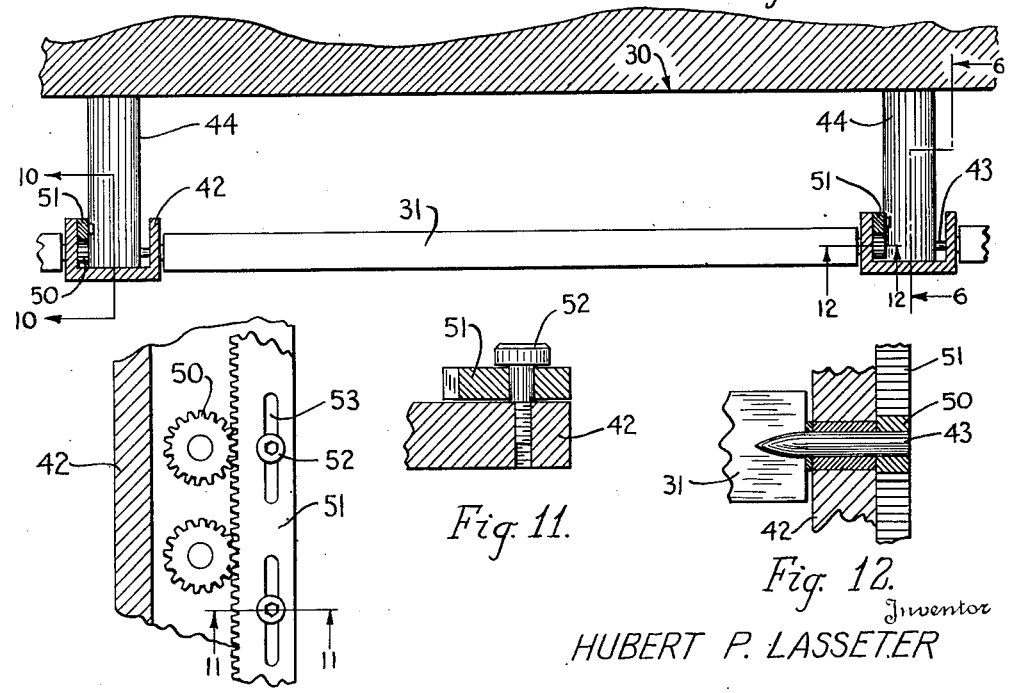
Fig. 11.
Fig. 12.
Fig. 10.
Inventor
HUBERT P. LASSETER
By Kimmel & Crowell
Attorneys

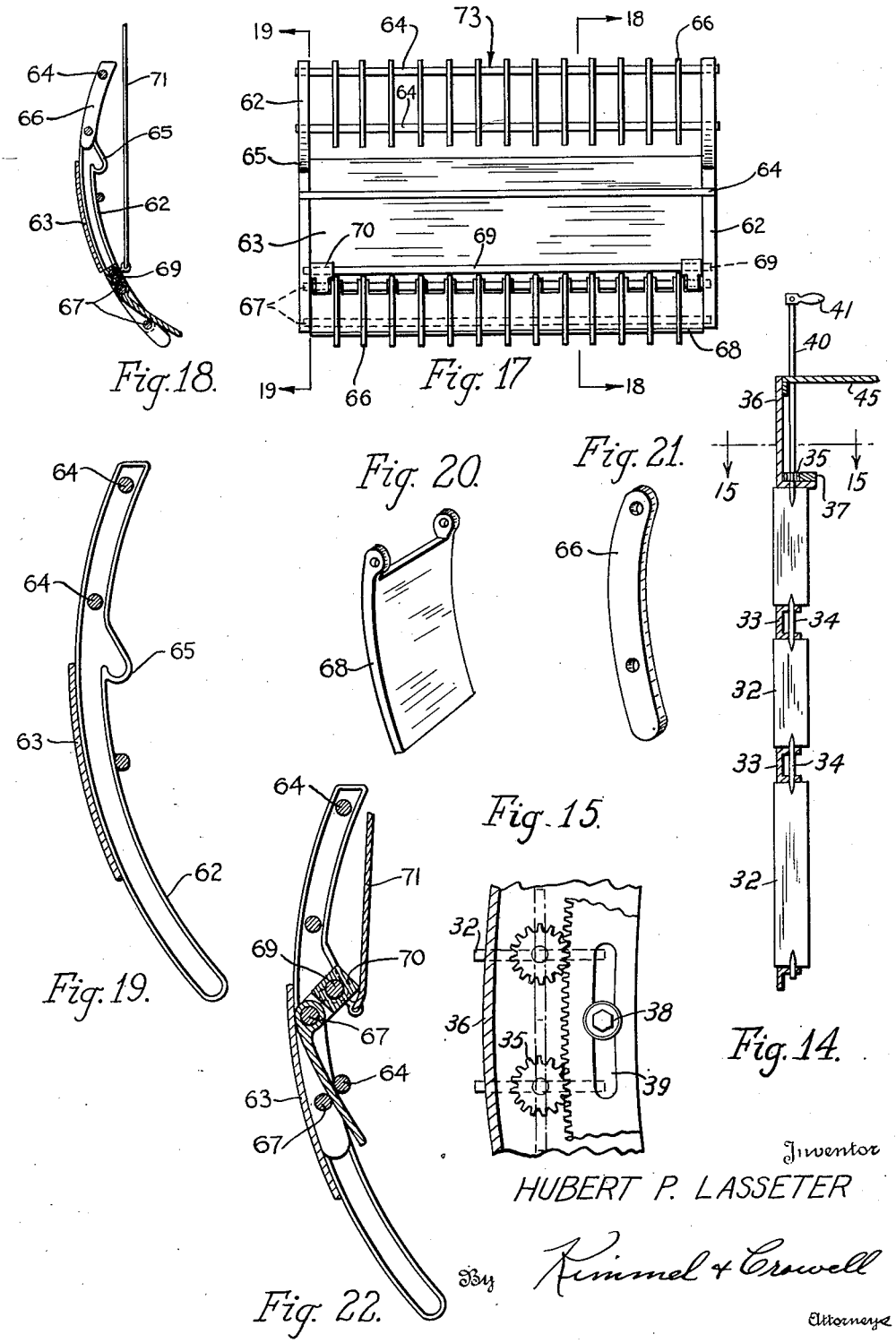

Patented May 16, 1950

2,508,068

UNITED STATES PATENT OFFICE 2,508,068

SHIP STABILIZER

Hubert P. Lasseter, Havana, Fla., assignor of one-half to George P. Koelliker, Tallahassee, Fla.

Application February 27, 1946, Serial No. 650,399

5 Claims. (Cl. 114—126)

This invention relates to a stabilizing means for vessels.

An object of this invention is to provide a means for attachment to the sides and stern of a vessel, particularly a fairly small vessel such as a fishing vessel or the like, whereby the vessel will remain on a more even keel during heavy weather.

Another object of this kind is to provide in a vessel an improved means for breaking up the waves striking the vessel when the latter is either anchored or moving so that the vessel will not be subjected to the impact of a large body of water.

A further object of this invention is to provide in a vessel an outer shell which may be rendered perforate or substantially imperforate as desired depending upon weather and water conditions.

A further object of this invention is to provide in a vessel an outer shell which is formed of pivoted plates or slats which in their closed positions are adapted to overlap each other, and which in their open positions are inclined in a manner to break up force of the impact of the waves by dividing the waves into small streams of water.

Still a further object of this invention is to provide a device which may be applied to any floating, mobile or stationary unit subject to the action of waves for breaking up the waves, as a breakwater, thereby protecting the unit from the action of large waves.

To the foregoing objects, and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawings:

Figure 2 is a top plan view,

Figure 3 is a vertical section taken on the line 3—3 of Figure 1,

Figure 7 is a perspective plan view of one of the lateral stabilizers,

Figure 8 is a perspective plan view of another lateral stabilizer,

Figure 9 is a horizontal section taken on the line 9—9 of Figure 1,

Figure 1:
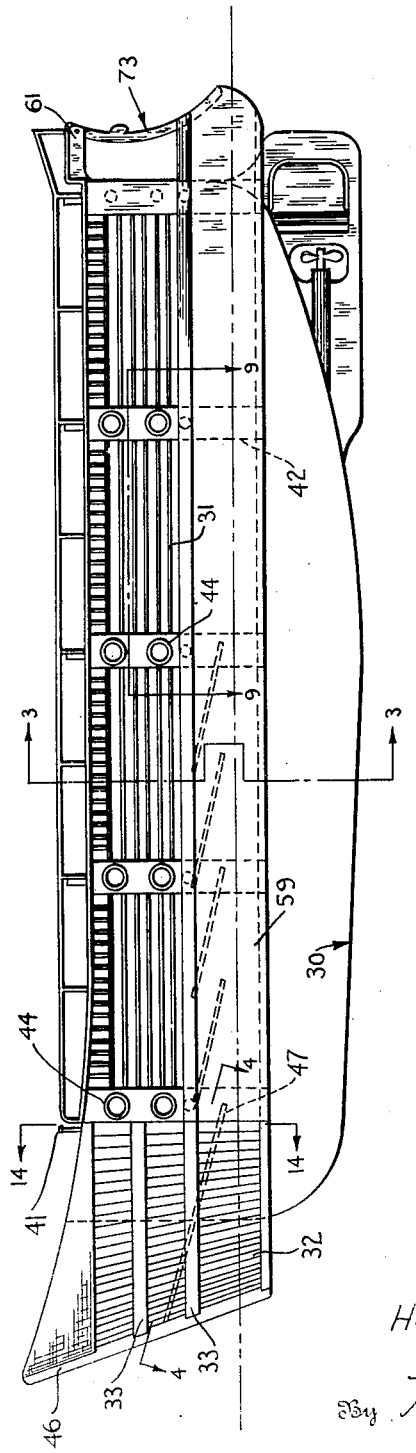
Figure 1 is a side view of a vessel constructed according to an embodiment of this invention.
Figure 6:
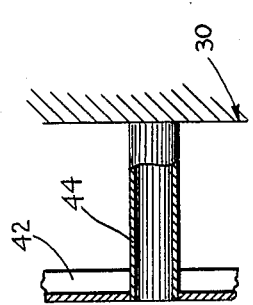
Figure 6 is a detail vertical section taken on the line 6—6 of Figure 9.
Figure 5:
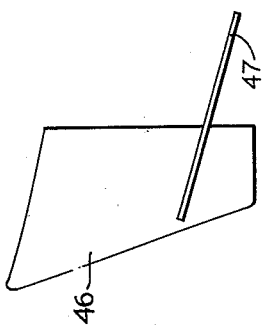
Figure 5 is a detail side elevation of the forward stabilizer.
Figure 4:
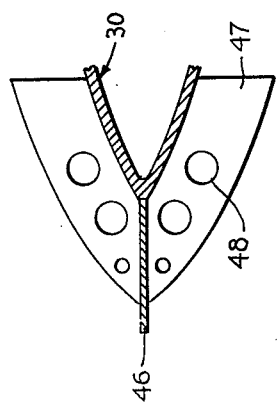
Figure 4 is a transverse section taken on the line 4—4 of Figure 1.

Figure 10 is a vertical section on line 10—10 of Figure 9, with the port hole tubes removed, Figure 11 is a horizontal section taken on the line 11—11 of Figure 10, Figure 12 is a vertical section taken on line 12—12 of Figure 9, Figure 13 is a fragmentary section taken on line 13—13 of Figure 2, Figure 14 is a fragmentary vertical section on line 14—14 of Figure 1, Figure 15 is a section taken on line 15—15 of Figure 14, Figure 16 is a detail plan view of a typical shaft connection to a fin, Figure 17 is a rear view of the rear fin assembly removed from the stern of the ship.

Figure 18 is a vertical section on line 18—18 of Figure 17,

Figure 19 is a vertical section on line 19—19 of Figure 17,

Figure 20 is a perspective view of one of the flaps removed from the assembly,

Figure 21 is a perspective view of one of the lower grill members removed from the grill assembly, and Figure 22 is a detailed vertical section of the rear fin assembly removed from the ship with the lower grill and flaps in the raised position.

Referring to the drawings, the numeral 30 designates generally the hull of a boat equipped with an embodiment of this invention for stabilizing a boat in rough water.

The stabilizing means operates by breaking up the large waves into smaller waves or streams, and this is accomplished by providing series of vanes or fins 31 and 32 along the sides and bow of a boat, which may be closed in smooth water to provide the least amount of resistance, and may be opened to form a grating to break up the waves in rough water.

The forward vanes 32 are supported in a vertical position along the bow of the ship by a series of vertically spaced apart channel beams 33 which are spaced outwardly from the sides of the ship 10. The vanes 32 are rockably mounted on the beams 33 and the lower vanes 32 are fixed to the vane immediately above by a rod 34, which is loosely carried by the beam 33. To rock the vanes a spur gear 35 is fixed to the rod 34 attached to the upper end of the uppermost vane 32, above the flange of the upper supporting beam 36.

A gear rack 37 is slidably secured to the upper side of the flange 36 by a bolt 38, fixed to the flange, engageable in the slot 39 of the rack 37. The teeth of the rack 37 engage the teeth of the gear 35 whereby any sliding movement of the rack 37 will rock the vanes 32 to open or closed position. The rack 37 is actuated by one of the gears 35, which is provided with a crank 40 having a handle 41, which may be actuated by an operator.

The vanes 32 are supported outwardly from the side of the ship by an extension of the deck plate 45, and the beams 33 are supported from the ship 30 by a vertical bow plate 46, and by fixed lateral stabilizer plates 47. The stabilizer plates 47 are fixed to the ship 30 so that the plates extend rearwardly and downwardly a short distance above the water line. The plates 47 are provided with openings 48 to break up the waves striking upwardly against the bottom of these plates 47. A plurality of stabilizer plates 47 are extended along the sides of the ship, just above the water line.

Immediately after the bow vanes 32, a series of horizontally rockable vanes 31 are provided along the sides of the ship. The vanes 31 are rockably supported from a series of vertical channel beams 42 by a rod 43 fixed to the ends of the vanes and extending through the flange of the beam 42. The beams 42 are supported outwardly from the sides of the ship 30 by a number of tubular supports 44, which are fixed to the sides of the ship 30. The tubes 44 are adapted to be secured to the port holes of the ship, so that the vision through the port holes is not obstructed by the vanes 31.

The vertical beams 42 extend downwardly from a point substantially level with the deck of the ship 30 to a point above the water line and just above the stabilizer plates 47. Smaller tubular supports 49 fix the lower end of the beams 42 to the side of the ship 30.

A spur gear 50 is fixed to the rod 43 between the beam 42 and the tube 44, for rocking the vanes 31 to open or closed position. Engaging the gears 50 is a gear rack 51 which is slidably mounted to a flange of the beam 42 by a bolt 52, fixed to the beam 42 and engaging in an elongated slot 53 in the rack 51. The rack 51 is actuated by a gear 54, mounted above the deck of the ship, having a crank 55 fixed to a rod engageable through the support 56 and fixed also to the gear 54. A spring pressed detent 57, fixed to the support 56 engages with gear teeth 58, formed in the hub of the crank 55 to lock the crank 55 in any selected position whereby the vanes are locked in any position from full open to full closed.

Also supported from the beams 42 is a vertical stabilizer 59, which extends along the side of the ship 30, and downwardly below the water line a short distance. The lower end of the stabilizer 59 is turned inwardly to form a short flange 60. The lateral stabilizers 47 are fixed between the vertical stabilizer 59 and the side of the ship 30.

A grill 73 is fixed to the stern of the ship 30 between the vertical stabilizers 59, and by an upper support 61 extending rearwardly from the deck of the ship, in order to break up any waves approaching the ship from the rear.

The grill 73 is composed of a pair of arcuate channel guide members 62, fixed together by a plate 63, and horizontal rods 64 fixed to the upper end of the guides 62. The grill 73 is so positioned that the convex side of the guides 62 faces forward. The guides 62 are formed with channeled hooks 65 on the rear side thereof located above the horizontal center line of the guides 62. The lower end of the guides 62 terminate slightly above the water line. A plurality of grill members 66 are fixed to the two upper transverse rods 64 above the plate 63 and are spaced apart to form a grill. A pair of rods 67, extend across the grill 73 below the rods 64 and are loosely engaged at their ends in the channel guides 62 so that the rods 67 may slide in the guides 62. A series of fixed grill members as 66 are fixed to both rods 67 and are positioned between adjacent flaps 68, which are rockably mounted to the upper of the two rods 67. The flaps or plates 68 are arcuate and are so located that in the lower position they are rockable rearwardly of the grill 73 about the upper rod 67. The lower rod 67 abuts the forward side of the plate 68 to prevent rocking the plates forwardly. A bar 69 extends across the grill above the upper rod 67 and is hingedly connected to the upper rod 67 by a hinge block 70. In the upper or raised position as shown in Figure 22, the bar 69 rests in the hooks 65 and holds the flaps 68 and lower grill members 66 above the water. A cable 71 is fixed to the blocks 70 to raise and lower the rods 67 and bar 69. As seen in Figure 18, in the lower position of the sliding grill 72, composed of grill members 66 and flaps 68, the sliding grill 72 extends below the guides 62 into the water. In the upper position the flap 68 is wedged between the rods 67 and lowermost rod 64 to prevent the flaps from rocking in any direction while in the raised position.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claims.

What I claim is:

1. Stabilizing means for a vessel wherein said means comprises a pair of arcuate channel guide members, means supporting said members in horizontally spaced relation, rods extending between said members and slidable therein, outwardly rockable flaps hinged to one of said rods for coaction with the water of flotation, grill members fixed to said one rod and another of said rods between adjacent flaps, and keeper means carried by said guide members for supporting said grill members and said flaps in a raised position on said guide members.

2. A stabilizing means as set forth in claim 1 wherein said latter means is formed by an outward projection of said guide member.

3. A stabilizing means for a vessel comprising rockable vanes spaced outwardly from said vessel for coaction with the water of flotation, elongated vertical plates extending along the sides of the vessel and spaced therefrom, downwardly and rearwardly extending horizontal apertured plates fixed to the vessel between the sides of the vessel and said vertical plates and gear means for rocking said vanes.

4. A ship stabilizer comprising a pair of arcuate channel guide members, means securing said guide members in horizontally spaced facing relation to the stern of the ship transversely thereof and spaced therefrom, flat plates rockably mounted between said guide members for coaction with the water of flotation, supporting means for said plates having a plurality of transversely extending members slidable in said guide members, and a hook means carried by said guide members in which at least one of said transversely extending members of said supporting means is engageable in the raised position of said plates for securing said plates in the raised position.

5. A ship stabilizer as set forth in claim 4, wherein said hook means includes a downwardly and rearwardly extending portion of said channel guide means.

HUBERT P. LASSETER.

REFERENCES CITED

The following references are of record in the file of this patent:

UNITED STATES PATENTS

| Number | Name | Date |
|---|---|---|
| 124,136 | Hughes | Feb. 27, 1872 |
| 1,188,269 | Greco | June 20, 1916 |
| 1,428,461 | Waitz | Sept. 5, 1922 |
| 1,499,900 | Zuker | July 1, 1924 |

FOREIGN PATENTS

| Number | Country | Date |
|---|---|---|
| 6,012 | Great Britain | Apr. 21, 1915 |
| 19,496 | Great Britain | Oct. 17, 1893 |
| 25,060 | Great Britain | Nov. 28, 1898 |
| 494,873 | France | June 11, 1919 |
| 564,594 | France | Oct. 24, 1923 |